United States Patent
Ligorano et al.

(10) Patent No.: US 9,069,121 B2
(45) Date of Patent: Jun. 30, 2015

(54) FIBER OPTIC TAPESTRY

(76) Inventors: Nora Ligorano, Brooklyn, NY (US); Marshall Reese, Brooklyn, NY (US)

( * ) Notice: Subject to any disclaimer, the term of this patent is extended or adjusted under 35 U.S.C. 154(b) by 121 days.

(21) Appl. No.: 13/536,125

(22) Filed: Jun. 28, 2012

(65) Prior Publication Data

US 2013/0010004 A1   Jan. 10, 2013

Related U.S. Application Data

(60) Provisional application No. 61/505,874, filed on Jul. 8, 2011.

(51) Int. Cl.
*G02B 6/04* (2006.01)
*G09G 5/10* (2006.01)
*F21V 8/00* (2006.01)

(52) U.S. Cl.
CPC .. *G02B 6/04* (2013.01); *G09G 5/10* (2013.01); *G02B 6/001* (2013.01)

(58) Field of Classification Search
CPC ..... D10B 2101/06; G02B 27/06; H04N 5/378
USPC .......................................................... 385/901
See application file for complete search history.

(56) References Cited

U.S. PATENT DOCUMENTS

| | | | |
|---|---|---|---|
| 4,234,907 A * | 11/1980 | Daniel | ........................... 362/556 |
| 4,519,017 A | 5/1985 | Daniel | |
| 4,754,371 A | 6/1988 | Nitta et al. | |
| 4,855,663 A | 8/1989 | Matsui et al. | |
| 4,875,144 A | 10/1989 | Wainwright | |
| 5,001,306 A | 3/1991 | Purcell | |
| 5,037,172 A | 8/1991 | Hekman et al. | |
| 5,066,085 A | 11/1991 | Gimbutas et al. | |
| 5,097,396 A | 3/1992 | Myers | |
| 5,183,323 A | 2/1993 | Daniel | |
| 5,187,765 A | 2/1993 | Muehlemann et al. | |
| 5,226,105 A | 7/1993 | Myers | |
| 5,256,468 A | 10/1993 | Wiener | |
| 5,280,558 A | 1/1994 | Wiener | |
| 5,307,245 A | 4/1994 | Myers et al. | |
| 5,424,922 A | 6/1995 | Wise | |
| 5,432,876 A | 7/1995 | Appeldorn et al. | |
| 5,568,964 A | 10/1996 | Parker et al. | |
| 5,659,643 A | 8/1997 | Appeldorn et al. | |
| 5,813,148 A | 9/1998 | Guerra | |
| 5,845,038 A | 12/1998 | Lundin et al. | |
| 5,887,102 A | 3/1999 | Mueller et al. | |
| 5,921,674 A | 7/1999 | Koczi | |
| 6,005,692 A | 12/1999 | Stahl | |
| 6,217,188 B1 | 4/2001 | Wainwright et al. | |
| 6,259,855 B1 | 7/2001 | Lundin | |
| 6,361,198 B1 | 3/2002 | Reed | |

(Continued)

*Primary Examiner* — Amare Mengistu
*Assistant Examiner* — Shawna Stepp Jones
(74) *Attorney, Agent, or Firm* — Jordan and Hamburg LLP

(57) ABSTRACT

A woven fiber optic tapestry for conveying a specific representation of data on a woven fiber optic threaded surface. The tapestry is provided in a particular system including fiber optic threads threadedly arranged together to form a woven fiber optic panel, in which each of the threads is operatively connected to a light source, and a data interpretation device operatively connected to the light sources so as to provide a transfer of a pre-assigned value of data from the data interpretation device to the light sources and the threads, the transfer of the pre-assigned value causing an illumination of the light sources so as to correlate to a specific representation of the data.

18 Claims, 9 Drawing Sheets

(56) References Cited

U.S. PATENT DOCUMENTS

| | | |
|---|---|---|
| 6,367,941 B2 | 4/2002 | Lea et al. |
| 6,535,667 B1 | 3/2003 | Gozum et al. |
| 6,628,885 B1 | 9/2003 | Wilkie et al. |
| 6,636,686 B1 | 10/2003 | Belfer |
| 6,651,365 B1 | 11/2003 | Wainwright |
| 6,709,142 B2 | 3/2004 | Gyori |
| 6,793,360 B2 | 9/2004 | Goslee |
| 6,817,734 B2 | 11/2004 | Hauck |
| 6,851,844 B2 | 2/2005 | Guy |
| 6,922,519 B2 | 7/2005 | Page |
| 7,137,416 B2 | 11/2006 | Brochier et al. |
| 7,168,862 B2 | 1/2007 | Qi et al. |
| 7,234,853 B2 | 6/2007 | Givoletti |
| 7,274,844 B2 | 9/2007 | Walt et al. |
| 7,352,951 B2 | 4/2008 | Gotfried |
| 2006/0087832 A1* | 4/2006 | Peng et al. ............... 362/103 |
| 2007/0035706 A1* | 2/2007 | Margulis ................. 353/122 |
| 2008/0019659 A1 | 1/2008 | Tao et al. |

* cited by examiner

FIBER OPTIC TAPESTRY

CROSS-REFERENCE TO RELATED APPLICATIONS

This application claims the benefit of U.S. Provisional Application No. 61/505,874, filed Jul. 8, 2011, the entire contents of which is hereby incorporated by reference.

BACKGROUND OF THE INVENTION

The present invention relates to a new media art form, and more particularly to an interactive media art form, which displays visually changing color patterns in response to one or more supplied data streams, either in real time or as playback of stored data on a woven, threaded surface of fiber optic threads.

Throughout the ages, and continuing to present times, weaving has and continues to epitomize social interaction. Textiles have a shared history throughout the world's cultures and are common throughout time. In European culture, medieval tapestries told narratives, and in the 21st century, we find our stories threaded and networked throughout the web.

Electronic optical art technologies, such as a liquid crystal displays (LCDs), field-emission displays (FEDs), and plasma display panels (PDPs) have been heretofore described for displaying various images in a form embodying a relatively thin profile, such that such displays are suitable for wall mounting or portable applications.

However, traditional woven crafts have not heretofore been employed for display of dynamically changing patterns.

SUMMARY OF THE INVENTION

It is therefore an object of the invention to provide a new media art form that synergistically blends traditional textile arts with contemporary communication materials and processes to redefine the role of a tapestry in contemporary culture, and provide a visual "weaving" of information, which can function as a dynamic data visualization screen or mural.

It is a still a further object to create a computer controlled fiber optic tapestry which fuses traditional arts, digital electronics, interactivity, and data scraping with contemporary art.

These and other objects of the invention are achieved by utilizing one or more meshes of woven fiber optic threads that each comprise a woven fiber optic panel of the present invention. Each panel is lightable by arrayed light sources optically coupled at a peripheral border of the panel, all of which is enclosed within a housing.

The fiber optic panel serves as a new media canvas for display of images "woven" from optically converted information, using fiberoptic filaments to carry and display the optically converted information and data from a suitable source, for example, the Internet, in the form of changing light patterns and/or colors, which can be programmed to change with variable speeds and durations. The fiber optic panels are woven to create a tapestry capable of emitting light. It is noted that the term "tapestry" is being used to refer to a woven mural design made up of woven fiber optic threads, since not all weaves meet the literal requirement of the term "tapestry."

When the fiber optic panels are woven on a handloom, the weaving process automatically etches or abrades the fiber optic surface of the individual fibers, allowing light to be emitted along the length of the fibers. The light sources are controlled by a computer responsive to information collected from a selected external source, for example, as in this invention, the Internet, which is converted to light emission data for displaying emitted light as a changing color pattern on the surface expanse of the tapestry. Other external sources may be used to trigger the light patterns, such as sound, video or audio or movement detected through various sensors.

The fiber optic woven "tapestry" functions as a data visualization canvas, which displays information on its surface as woven light. The surface is animated and dynamic based on various data sources and sets including, but not limited to, TWITTER. It can also read flight information from airport arrivals and departures, scraping a database that supplies this real time information. The tapestry according to an embodiment of the invention has further potential to read and display, in abstract dynamic light patterns, other exemplary data sets, such as stock market quotes, or energy usage/or energy efficiency in a green building so as to create a visual thermostat.

The optical tapestry according to the invention could optionally serve as a sonically or visually interactive surface, using sound to trigger the surface patterning or a video camera to interact with movement from an exterior real time source in order to provide such patterning. Additionally, the tapestry can respond to data from a customized website, or other types of data.

The tapestry is also optionally addressable by smart phones. The tapestry can also be controlled with commands to display specific pre-programmed patterns. It can be conceivably programmed using TWITTER TWEETS to panel display particular colors and patterns.

The patterns and light variations that are displayed on the panel's surface are all predetermined and predefined, and their timing and transitional rates are assigned. As such, these are not randomly blinking lights. However, they also could be such.

In a particularly advantageous embodiment, the woven optical fiber panels are optically coupled at a periphery thereof to suitable color controllable light sources, for example, RGB LEDs to illuminate the warp and the weft. The LEDs are computer controlled and programmed to change color and pattern so as to be responsive to the conversion of the aforementioned collected information.

In accordance with an embodiment of the invention, the computer controlling the display on the tapestry parses information from TWITTER and other data sources to display color, light and pattern onto multiple fiber optic panels according to the invention using the color variable light sources, for example, the RGB LEDs mentioned above. The resulting real-time animation is an abstract, data visualization that continually updates as data changes.

The tapestry display, and assembly thereof, comprises one or more woven fiber optic panels that are created, for example, by conventional weaving techniques, using plastic fiber optic thread. The fiber optic threads are optionally woven in a weft faced 20 four-harness satin weave, known as a "satin weave construction." Other weave structures can be used as well. As in all woven textiles, the panels have warp and weft threads.

As mentioned above, a natural etching of the fiber optic threads occurs as a result of abrasion from the weaver's shuttle on the surface of the plastic fiber optic threads and the thread's contact with the loom's sand bar. The surface of the threads may be further advantageously etched or scratched by hand so as to allow for an enhanced diffusion of light therethrough. Each fiber optic mesh also has warp and weft end threads. All sides are free, allowing them to connect to the RGB LEDs.

A portion of the electronics enabling controlling of the LEDs are housed conveniently on electronic circuit boards, each board consisting, for example, of four integrated circuits (IC). Each IC controls a time manageable number of LEDs, for example, ten. There is a transreceiver chip on each board that sends commands to all four ICs. Each board, in such example, has forty RGB LEDs. This allows programming and control of each LED individually for color and luminosity.

A housing is provided, conveniently in the form of a four (4) sided, optionally metal or plastic box, with a window cut in the front. The box houses four of the aforementioned circuit boards on inner walls of the box, one on each of four sides thereof. The woven fiber optic panel described above is sandwiched between two clear Plexiglass plates and this sandwich is then attached to the inside of the front window of the housing. This sandwich is advantageously locked into place within and to the housing a conventional type, or custom designed, locking tab.

The end threads of the woven panels are attached to the RGB LEDs through light guides in the form of coupling plugs, made conveniently from black, heat shrink tubing, and each is advantageously fitted with a mirror MYLAR inner lining, which enhances the reflection of light. This entire construction is advantageously designed to be non-adhesive, so as to allow the assembly to be broken down into its basic components of circuit boards, fiber optic panel, light-guides (plugs) and housing.

An example of suitable configuration software for implementation of the invention is MAX MSP. MAX may be used to program RGB values for the LEDs, and can make pattern animations by programming fades. The boards are programmed using suitable software, such as, for example, MAX. All of this information is stored in the nonvolatile memory of the ICs of the circuit boards.

As a particular display embodiment in accordance with the invention is developed, a combination of programming languages is generally used. For example, PYTHON to use data from the Internet to control and trigger patterns on the fiber optic panels, MAX for testing and perhaps for standalone visualization pieces that are not triggered by Internet data. The program PURE DATA can also optionally be used to trigger the panels with sound. Both PYTHON and PURE DATA are open source software. MAX is an open license for use with APPLE products.

In practice, the warp and weft ends of the woven fiber optic meshes are connected to the RGB LEDs that are electrically connected (e.g., soldered) to the circuit boards. The boards are connected to and controlled by a computer, as shown in FIG. 9, which is for example, on-line, on the Internet, scraping databases for specific information. These programs are also designed to operate from the computer hard drive as files. It will therefore run live from the Internet and/or as a file stored on the computer's hard drive. As will be understood, one or more of the IC boards and the computer comprise a data interpretation device for implementing the invention, and in which the term "computer" comprises, optionally, a conventional desktop or laptop computer, a smartphone or any other device capable of digital processing, transmission and/or reception of a digital signal; in which the data interpretation device is contemplated to be communicable with the tapestry of the present invention through a wired connection, though a wireless connection is also contemplated.

A search is carried out for pre-determined language using, for example, PYTHON, for data scraping. In accordance with an example of the invention, words are pre-assigned a numeric value such that the words comprise a specific data that is receivable by the data interpetation device and correlated with the pre-assigned value, for example, so as to define a color and pattern that is translated onto the surface of the woven fiber optic canvas. For example, the word "people" is assigned an RGB value of 255-255-0 (Pure yellow), and triggers the first group of 20 LEDs on to the weft of the fabric, depending on the frequency by which the word is said. The display of the pattern is pre-defined by the number of times the word is said in a given time frame, which frequency is also optionally a specific data. The colors are RGB, and transition rates vary from on/off to an imperceptible transition that can last for hours. Each of these aspects including, optionally, the aforementioned pattern, colors and transition rates are combinable so as to provide and correlate to a specific representation of the specific data. As provided for herein, other types of specific data may also optionally comprise sound, relative information between one or more predetermined items and/or interactive information.

All activity on the surface of the fiber optic canvas is prompted by either real time information (i.e., received as data input live from the Internet or other inputs), or by recorded information (i.e., information drawn from a prerecorded archive of data implemented in playback mode).

A working example of the tapestry called "50 Different Minds" debuted prior to the filing of Applicant's U.S. Provisional Patent Application No. 61/505,874 at the San Jose Museum of Quilts and Textiles as part of the Zer01 Festival in San Jose, Calif. The piece measured 50 by 50 inches. It displayed patterns and colors that related to TWITTER TWEETS of color words. It also used air traffic data from the nine busiest airports in the U.S. Horizontal and vertical lines on the tapestry's surface moved in real-time, and were synchronized with the longitude and latitude of arriving and departing flights.

Visitors could also interact with the tapestry by tweeting additive and subtractive color names. The tapestry is programmed to display colors in response to TWEETS written using the expression "#optictapestry," and then primary and secondary color words, like "blue," "red," "yellow," "magenta," "cyan," etc.

In San Jose at Zer01, the tapestry consisted of nine (9) individual woven fiber optic panels, measuring a total of 50×50 inches, see FIG. 9. The inspiration for the patterns and colors derived from the color theory of painter Josef Albers and his wife Anni Albers' work in textiles.

While on display in San Jose, the tapestry was connected to the Internet and scraped data in real time. There are four routines for 50 Different Minds. Two computer programs drive the surface animation, one of which listens for TWITTER TWEETS, and the other of which follows flight arrivals and departures at the nine busiest airports in the U.S. Specific search terms are associated with patterns and color frequencies. When queried, information is parsed and assigned a pattern, which triggers a display of changing pattern and/or color. The animated effect looks like illuminated silk.

DETAILED DESCRIPTION OF THE INVENTION

A representative example of the invention, and its manner of construction and use, is embodied in the following description, and is directed to an operational system which has actually been constructed and operated. It is noted, that while serving as a concrete example of the structural configurations, hardware and software for implementing a working model of the media art form according to embodiment of the invention, the specific details are intended merely as being representative of one possible approach to construction, as well as just a few examples of various operational modes (routines). Many other alternative structural components and operating modalities (software and routines) are contemplated within the scope of the invention.

Figure 1:
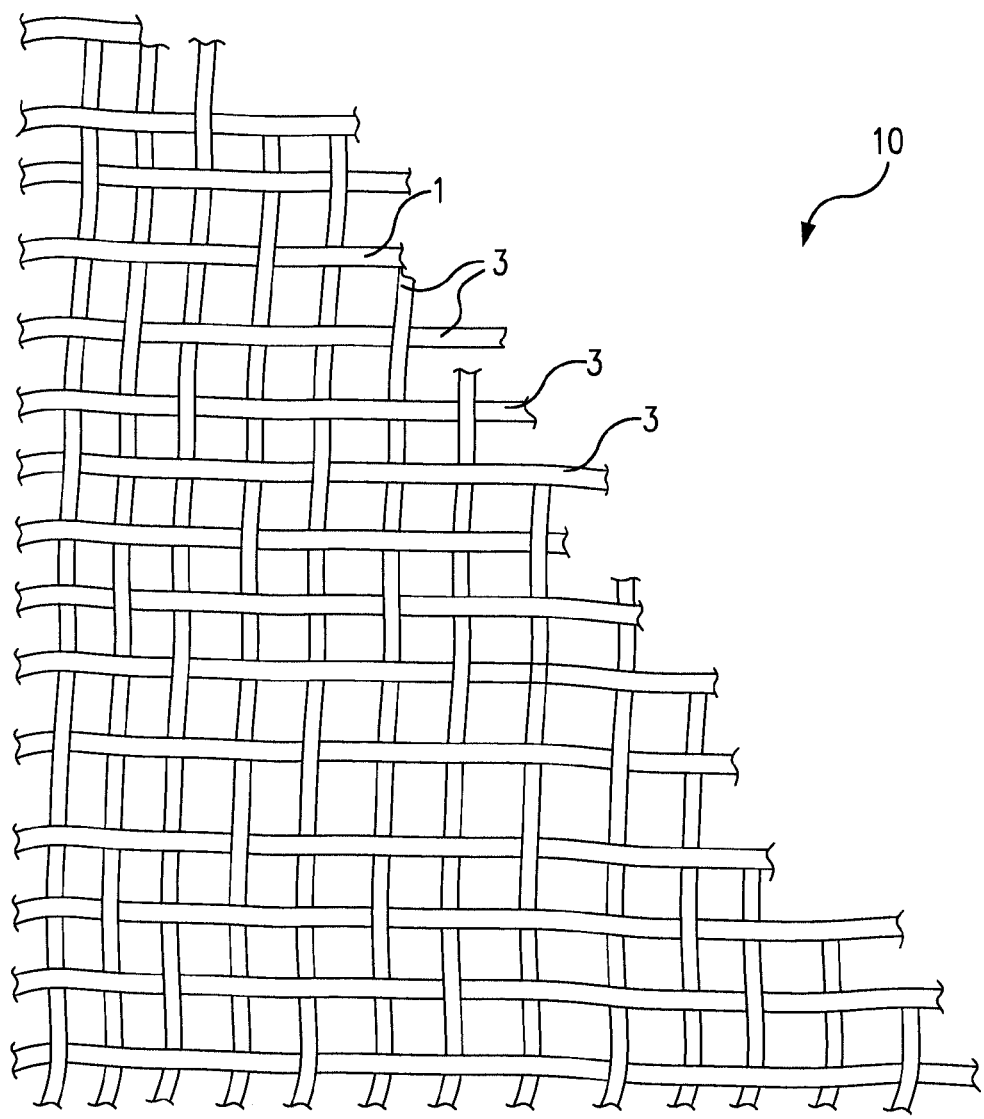
FIG. 1 is a partial plan view of a woven fiber optic thread panel according to an embodiment of the invention.
Figure 4:
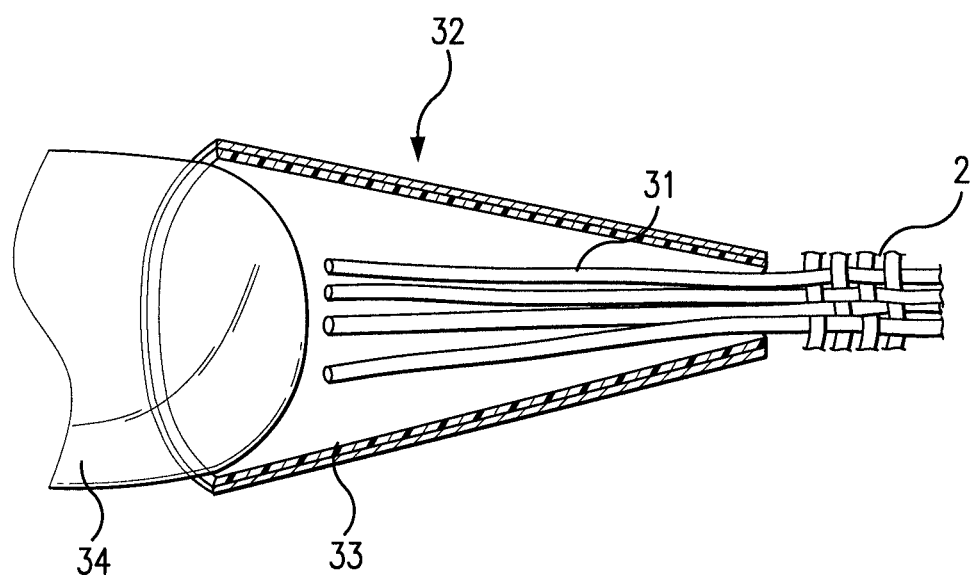
FIG. 4 is a partial cross-sectional view of the light-guide (plug) and LED of FIG. 3.

In accordance with the example, and as partially depicted in FIG. 1, fiber optic threads 1 woven in a pattern forming a fiber optic woven mesh 3 and comprising a woven fiber optic panel 10 of the present invention is shown in a weft faced 4-harness satin weave with a stitching 2, see FIG. 4, sewn around all four sides to restrain the individual threads 1. The hem 2 is sewn with a polyester thread, but could alternatively be sewn with a monofilament or thin thread as well. The fiber optic woven panel 10 of the example measures 12×12 inches and is woven on a hand loom.

When weaving of the panel is complete, it is subsequently flattened using a heat-set press for 3-5 minutes at a temperature of 250 degrees.

A natural etching of the fiber optic threads 1 occurs as a result of abrasion from the weaver's shuttle on the surface of the plastic fiber optic threads 1 and the sand bar, which is part of a hand loom. The surface of the threads 1 are further advantageously scratched using a light sand paper and/or a scapel knife to scrape the surface allowing more light to leak along the length of each of the fiber threads 1, which would otherwise remain within each of the threads 1 over its length.

Figure 2:
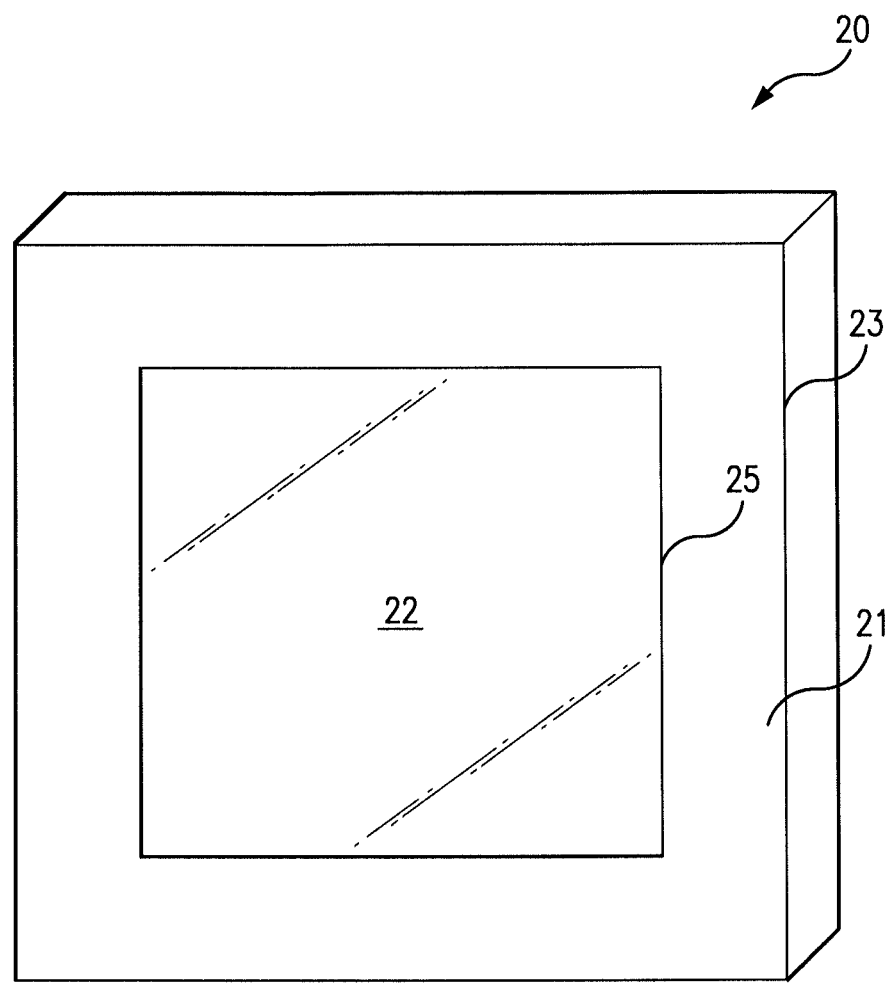
FIG. 2 is perspective view of a fiber optic panel housing according to an embodiment of the invention.

In looking to FIG. 2, a lighting module 20 defines a panel housing 21 comprising, optionally a metal or plastic frame having approximately a 15.5" outer dimension and a rim thickness of approximately ⅛". Housing 21 encloses the woven panel 10, which optionally comprises etched fiber optic thread (Mitsubishi CK-20 Eska 5 mm). Portions of the housing 21 are conveniently cut on a laser cutter and joined using, a suitable bonding material, for example, Weld-On 3 solvent. On the inside of the housing, an inner 1/16" thick Plexiglass window 22 comprising two plates 25 of museum non-reflective Plexiglass each having an edge 23 and measuring 12×12 inches are provided and held in place with Plexiglass locking tabs (not shown) in each corner of the housing 21. The fiber optic panel 10 is sandwiched between the plates 25.

Figure 3:
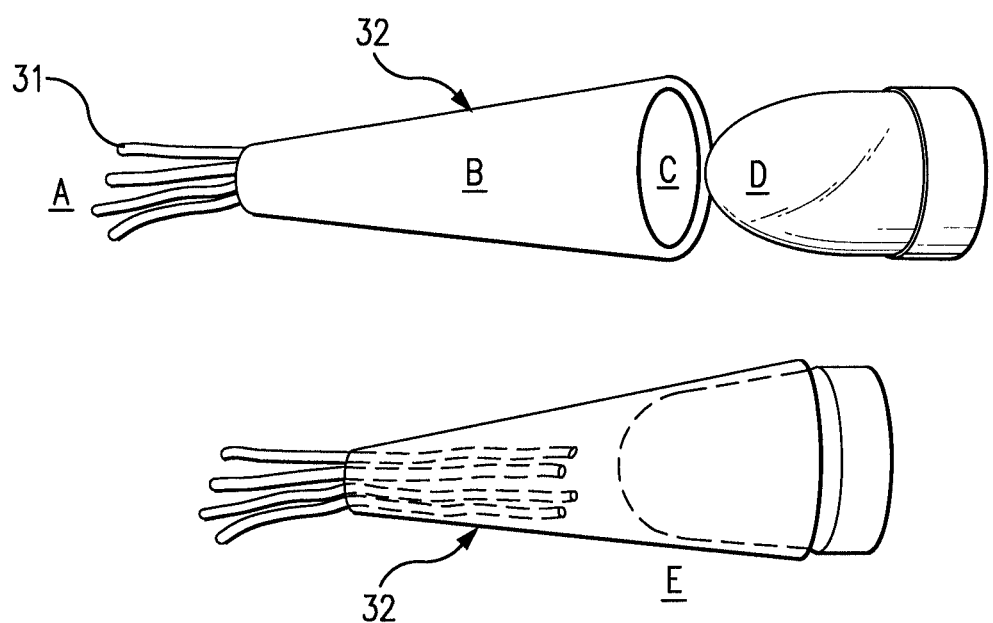
FIG. 3 is an explanatory view depicting a manner of coupling light sources with the fiber optic threads via light-guides (plugs)

As depicted in FIGS. 3 and 4, groups 31 of four to five fiber optic thread ends are fed, as at "A," perpendicularly from the panel 10 edges into a reflective connector, referred to herein as a light-guide (plug) 32, as at "B," which is made, for example, from 5 mm heat shrink tubing (3:1 polyolefin, HS3-0188, black). The fiber optic threads 1 measure ⅞ inch to 1 inch in length from the end of the weave structure to the end of the thread.

The light-guides (plugs) 32 are conveniently handmade by heat shrinking them using a silicon mold which has multiple conical forms customized to the size of the RGB LEDs and baked at a temperature of 220 degrees in an oven. They are lined with a square of reflective MYLAR 33 measuring ⅝ inch square. The MYLAR squares are inserted by handrolling them into the light-guide's (plugs) 32 heat-shrink casing.

The light-guides (plugs) 32 are attached to lights, as at "C" and "D," by sliding them over the tip of a Red-Green-Blue (RGB) light emitting diode (LED) 34 (for example, Superbright RGB 599R2GBC-CA) mounted on a printed circuit board (PCB) 35. The placement of the fiber optic thread ends in relation to the tip of the RGB LEDs varies ¼" to 1/16" from the end of the thread to the front tip of the LED surface when fully assembled, as shown at "E."

The PCB (12 inches×1 inch) spans the edge of the panel 10 and secures forty RGB LEDs, four microcontrollers (Motorola PIC18F4620-I/P), supporting power circuitry (including capacitors, crystals, transistors and resistors), and a serial data transceiver circuit (MAX483 RS-485). There is one board 35 on each side of the four-sided housing 21.

Figure 6:
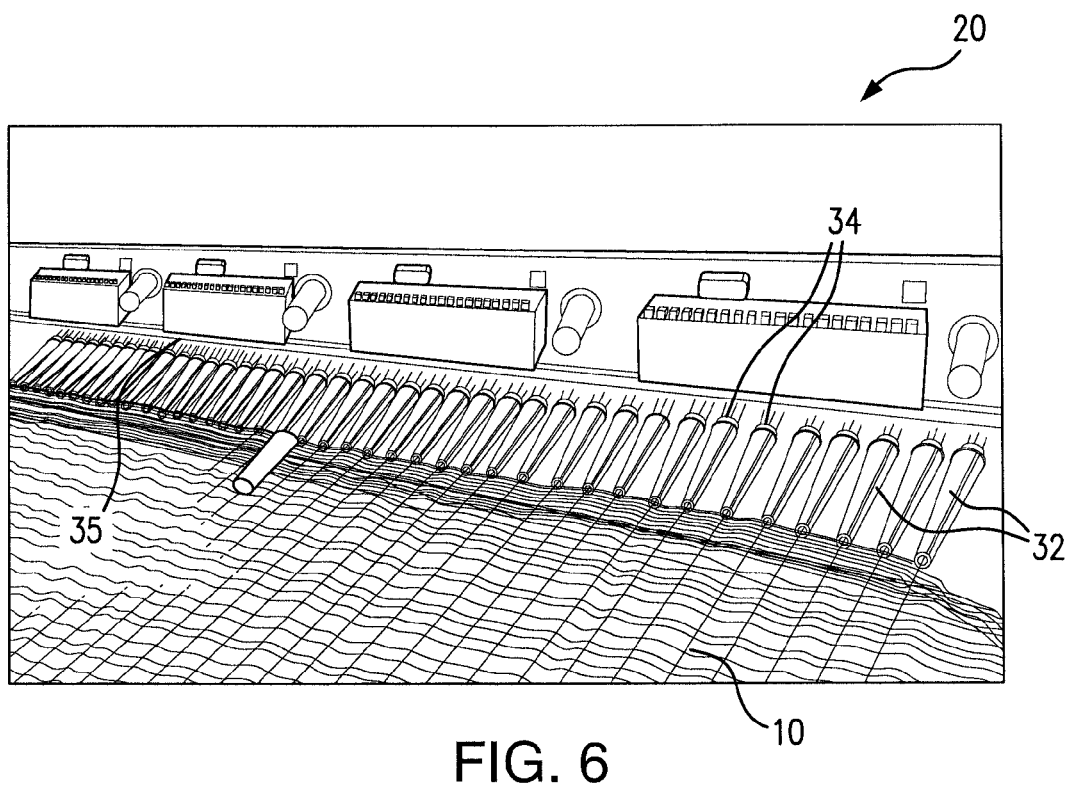
FIG. 6 is a perspective view of an interior side of a fiber optic panel housing according to the invention.

The module 20 is designed so that the fiber optic mesh, above electronics and PCBs, and the housing can be assembled and disassembled with respect thereto so as to be containable within the housing, as shown in FIG. 6.

Therein, the circuit boards 35 are held in place by with 6/32 nylon screws, ¾" in length. Each microcontroller controls ten RGB LEDs and applies independent pulse width modulated (PWM) signals to the red, green, and blue terminals of the LEDs and holds a unique chip identification number (ID) in nonvolatile memory space.

Four identical PCBs, one per side of the module 20, are attached to the woven panel 10 and are supplied with remote power and serial data. A 5V 50 amp power supply and 4 power jumpers per module 20, and multiples thereof, are contemplated for use in providing sufficient power.

Figure 9:
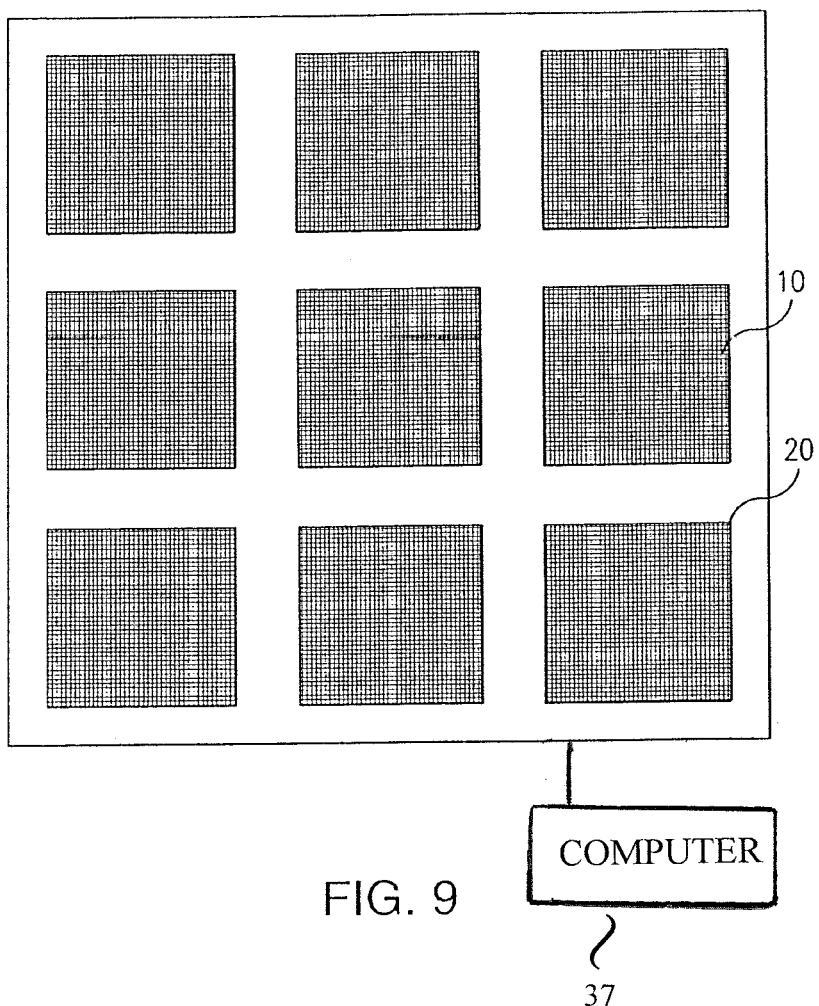
FIG. 9 is an illustration of the tapestry of the present invention comprising nine (9) modules and woven fiber optic panels thereof.

Data is transmitted from a Lantronix XPort Direct Plus (XPD100100S-01 ethernet-to-serial converter). There is one ethernet to serial converter per three panels in a tapestry construction comprising nine (9) modules 20, see FIG. 9, in which a set of three modules 20 is operatively connected mechanically in series and to data lines in order to receive and display information that is the same or similar. The data lines are connected in parallel to the three modules 20 using flat flex cables. Additionally, there are three flat flex cables per module 20.

Each data converter is assigned a static Internet protocol (IP) address, connected to an Internet switcher (Cisco SD205 Switch—5 ports), and receives formatted display data from a computer program. The number of identical lighting modules connected to the data converter is limited only by electrical factors and the microcontroller ID space.

The formatted display data is a standard UDP packet transmitted to the static IP address of the data converter and containing standard 8 bit RGB color data, the ID of the target microcontroller, and specifying the affected LEDs. This packet is received by the data converter and the color and target data is transmitted on a wired serial data line.

Each connected microcontroller checks the ID in the serial data and parses that data if that ID matches the number stored in memory. The RGB color data is converted to three PWM signals which are fed to the specified LEDs. These signals affect the power each basic color in the LEDs receives and thus the perceived color is displayed in the attached fiber optics. The microcontroller maintains this output until another serial packet is parsed. The entire system is updated by scanning through each microcontroller with display data.

The software for the fiberoptic tapestry installation consists of several layers of code written in the PYTHON language. The lowest level sends raw binary commands to the device over UDP (User Datagram Protocol) which the Lantronix UDP UART (Universal Asynchronous Receiver/Transmitter) device translates into serial commands to the hardware. The next highest level, the API (Application Programmer's Interface), translates drawing commands into low level binary commands. Examples of such commands allow the programmer to set the color of columns and rows, or change colors. Next, individual routines execute specific sequences of drawing commands to create the different content "programs," e.g., air traffic data. The final layer, the "harness," executes the different content programs in a rotating sequence.

Each of the computers or computer 37 used in conjunction with the tapestry of the present invention, and supporting apparatus including, for example, the aforementioned power supply, UDP, and converter are, optionally, housed in a separate equipment box (not shown).

The following describes examples of routines (referred to by the names "Comings and Goings," "Prelude," "Fifty Different Minds" and "Tweet Suite") to assist in an understanding of the versatility of the invention in practice.

It is to be understood that the tapestry comprising the invention may comprise a single module 20 or multiples thereof.

Comings and Goings

Comings and Goings is an air traffic routine that visualizes the incoming and outgoing air traffic at major airports around the U.S. In the aforementioned invention, the program module scrapes flight data from nine (9) of the busiest American airports. Each square panel in the tapestry represents a single airport while the warp and weft encode incoming and outgoing air traffic. A single LED that illuminates a bundle of four to five threads represents a flight and its distance from the airport is encoded in the position within the panel 10. Incoming flights are drawn as horizontal threads where the bottom of the panel 10 represents the airport. As flights land and get closer, the lines move from top to bottom. As flights take off and get farther from the airport, the lines move from left to right on the panel 10. The bottom and left represent a distance of zero miles from the airport, while the extreme top and right represent distances of 30 nautical miles from the airport.

For each airport under consideration, the latitude, longitude, and airport code are encoded in the software. It periodically loops through the list of airports and makes a query to a public API at flightstats.com requesting flights in the airspace of each airport. Using a PYTHON module called "mechanize," it retrieves the data which is returned in an XML format and contains the flight number, source, destination, and current position coordinates. The software then filters the list by removing any flight that is outside a 30 mile radius from the airport. The distance for filtering is the euclidean distance, i.e., sqrt[(longitude[airport] longitude[airplane])^2−(latitude[airport]−latitude[airplane])^2]. The incoming flights are then drawn as individual rows and the outgoing flights are drawn as individual columns. The position is determined by linear interpolation, mapping the range of 0-30 miles to the 160 threads in each direction. A flight 0 miles from the airport would be drawn at thread 0, a flight 15 miles would be drawn on thread 80, and so on.

In order to optimize the visual continuity of the drawing and give the illusion that the visualization is running in real time, the updated positions are slowly drawn over a period of time rather than all at once despite representing a snapshot in time. To accomplish this, an internal database is maintained with all the current flights. As the flight list is updated with each iteration, each flight is compared with the database and is determined to have changed or not. If the position has not changed since the last update, it will not be drawn. The average period of time required to draw the flights is then divided by the number of updated flights to determine the spacing between updates. So if the display is intended to last for 60 seconds, and there were 10 flights with new positions, each of the 10 updated positions are drawn every 6 seconds. To eliminate the need to update the entire display for each drawing operation, an internal double buffer is maintained in software. Each time a drawing operation occurs, it is drawn into the buffer first and compared with what has been sent to the hardware. Only changes are sent to hardware to minimize bandwidth requirements and more importantly, to prevent flickering as slow updates are sent out.

Prelude

The prelude routine uses colors mentioned on TWITTER's global timeline to drive an animation stepping through the three primary color groups red, yellow, and blue, in that order. The array of nine panels is arranged in a square, having three rows and three columns. Each of these nine squares is in turn divided into four horizontal stripes. Colors mentioned are drawn on each of these stripes and then slowly consolidated until all nine panels share the same color using a sort of "tournament bracket" algorithm. The first consolidation makes each of the nine panels the dominant color of its four stripes, the second consolidation makes each row the dominant color of its three panels, and the last consolidation makes all nine panels the dominant color of its three rows.

For each of the three primary colors, there are four variants enumerated in a data file, each with a search term and a RGB (Red Green Blue) color definition. For example, the primary color red may consist of the search terms "crimson," "blood," "fire," and "pink," each bearing a unique color definition. If the search term is used anywhere in a TWEET, one "hit" is counted for that color. To balance the unequal number of results each term may generate, each of the four variants constituting a primary color receives an equal representation by searching back as far as possible to obtain 36 hits (one stripe for each of nine panels). Next, they are sorted by time of mention to create an ordered list generating the variations in the animation.

After downloading the data from the Internet, one of the nine panels is selected at random to animate. For this panel, the row stripes are "painted" in order from top to bottom by selecting its color from the top of the ordered list. After drawing the four horizontal stripes, the most common color is determined. Ties are broken randomly. The panel is then slowly faded to the most common color.

After drawing all four horizontal stripes and fading to the dominant shade, another panel is selected at random from the remaining un-painted nine panels and the procedure repeats.

Once all nine panels have been striped and faded to the dominant color, consolidation occurs row-wise. For each of the three rows top to bottom, the dominant color is determined and then the row fades to that color.

Lastly, the dominant color of the three rows is determined and the entire array of nine panels fades to that color. Once this occurs, the striping and consolidation routine occurs for the next of the three primary colors.

Fifty Different Minds

In the Fifty Different Minds routine, the following keywords (one, people, name, listening, red, different, color, minds, fifty) are used to create pseudo-random numbers which determine the size of various zones. To generate a pseudo-random number within a given range, the timestamp of a TWEET (a large, unique integer) containing one of the keywords is divided by the maximum of such given range and the remainder is returned—i.e. the modulus.

Figure 5:
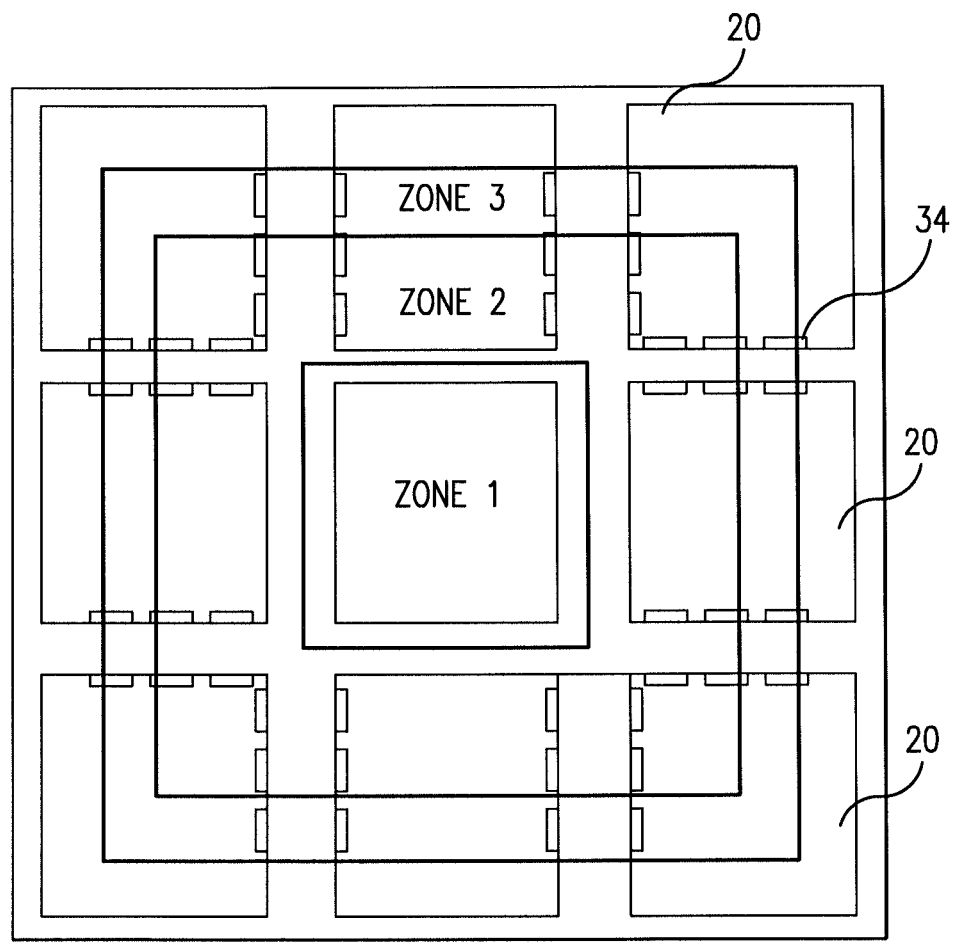
FIG. 5 is an illustration of a particular illumination of the tapestry according to the invention.

With reference to FIG. 5, respective Zones 1, 2 and 3 are provided and enable an illustration of exemplary LEDs 34 denoting each of the zones. In the routine, once every three seconds, Zone 1 is updated; every 5 seconds, Zone 2 is updated; every 7 seconds, Zone 3 is updated. Each update entails changing the color and the size of the zone with an approximately 5-second fade. Each zone is assigned a pre-programmed, looping sequence of three colors and the next in the sequence is used each time the zone is updated. Some zones may grow slightly from their nominal size—e.g. zone 1, nominally the center panel of the nine-panel array, may grow vertically by one row of 10 LED's above and below, to two (2) rows above and below, creating a vertically-oriented rectangle. The color of the area taken by the expanded zone takes precedence over the color of the next nominally-larger zone.

If a zone is allowed to expand n steps above the nominal size, a random number of maximum value n is determined by the algorithm given above. A number of 0 corresponds to drawing the zone in its nominal size; a number of 1 corresponds to drawing the nominal area plus the area of the first defined expansion, and so on.

This sequence continues for a set number of seconds before rotating to the next program in the harness.

Tweet Suite

The final routine example, "Tweet Suite," responds to TWEETS containing color words and the hash tag "#optictapestry" by creating outwardly-expanding concentric circles of color. Ripples is an interactive component of the invention. A person can send a TWITTER TWEET from their personal computer or smart phone from anywhere in the world using this hashtag command and the invention responds by displaying a color or pattern. The first color in the sequence is drawn on the smallest, innermost ring and slowly faded in over a random period of time ranging from 0.2 to 4 seconds. After the fade-in period, it is faded into the next larger ring as the next color in the sequence is faded in to the smaller ring, and so on. Black is added as the last color in the sequence to ensure the tapestry is completely off before moving to the next TWEET.

A database of color words and their RGB definitions is used to translate the colors found in a TWEET. If a color is not recognized, or is misspelled, it simply does not appear in the sequence. The routine does not run if there are no new TWEETS in the last fifteen minutes.

Figure 7:
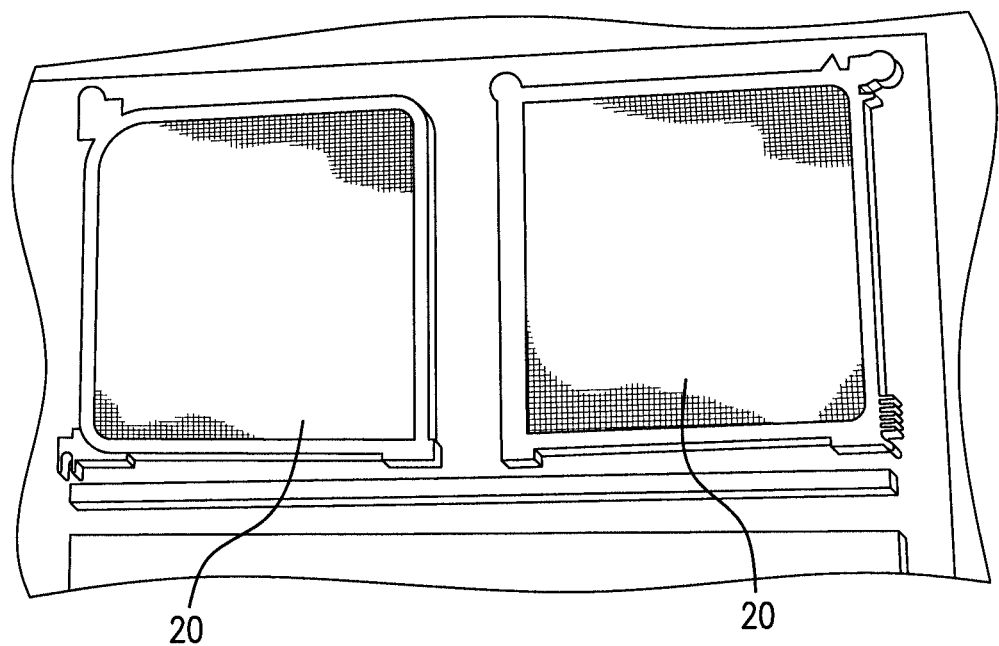
FIG. 7 is a perspective view of an assembly of a plurality of fiber optic panels according to the invention shown adjacently arranged, and in which a portion of the housing is removed to illustrate at least the panel contained respectively therein.

It is to be understood that the present invention contemplates a panel display comprising two or more adjacent modules arranged relative to one another, as shown in FIG. 7. In such arrangement, the modules are shown from a backside of the tapestry with a backside of their housings 21 removed in order to show that one or more may be connected to one another, optionally through use of screws or other fasteners.

In this way, one or more of the modules of the modular display comprising a tapestry of the invention may receive information from an information source or device that is different than an information source or device supplying information to an adjacent module. This is the case as each individual module of the modular display can be specifically programmed and connected with its own information source or device.

In a particular configuration, the tapestry may be programmed to execute and exhibit one or more combinations of the aforementioned routines in a predetermined order thereof.

When displaying one or more combinations of the aforementioned routines, or other information which the tapestry is adapted to exhibit, it is further contemplated that instead of the sandwiched configuration of the woven fiber optic panel described herein, that such a panel, measuring, optionally, 12" by 30" be tacked with monofilament onto a Plexiglass frame. In this way, the woven fiber optic panel and illuminated surface provided thereby is exposed to the environment whereby the woven fiber optic panel is sewn to the Plexiglass frame in which the sewing material is passed through the woven fiber optic panel and then through the Plexiglass frame.

As such, each of the several modules of the modular display comprising a tapestry of the present invention may further be useable to display one or more types or categories of information. Each component of information may, for instance, be displayed by one or more of the modules whereby illumination of a particular panel may be faded and patterned according to programming, as discussed hereinabove, which is used to interpret the information.

Figure 8:
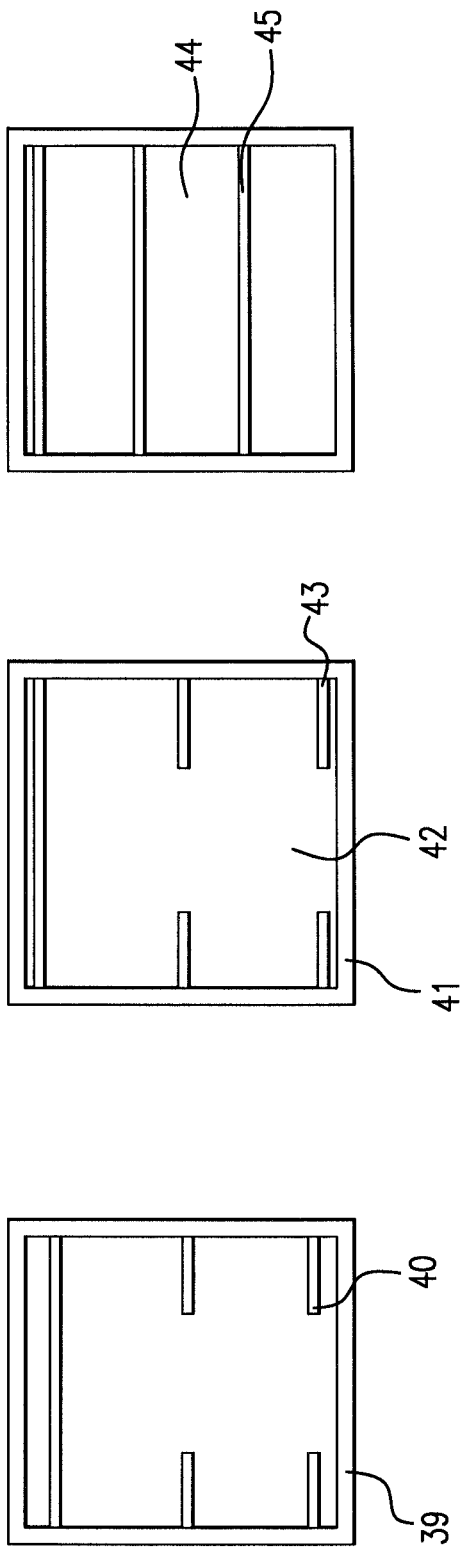
FIG. 8 is an illustration of the wall mounting system for use with a tapestry module of the present invention.

It is to be further understood that the module display comprising several of the aforementioned modules so as to comprise a tapestry of the present invention is mountable on a wall surface through, as shown in FIG. 8, use of a mounting system 38 comprising a first wall plate 39 that is attachable to a wall surface, and which provides cleats 40 to which a second wall plate 41, and specifically a back surface 42 thereof with cleats 43 carried thereon, matingly engage. A front surface 44 of second wall plate 41 carries rails 45 onto which carriages (not shown) carried on a back surface of a modular housing 21 ride so as to comprise the tapestry of the invention when mounted to a wall surface. Each of the rails and carriage are contemplated to comprise a construction commensurate with an IGUS rail and carriage system. In this way, the display provides an informative and aesthetically pleasing device able to be easily incorporated within a household or office environment.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An information relay system, comprising:
a plurality of woven fiber optic threads being threadedly arranged together to comprise a woven fiber optic panel thereof, each of the panels being comprised entirely of woven groupings of fiber optic threads extending in first and second opposing directions, and each of the threads being abraded to emit light over at least a portion of a length thereof;
a plurality of light source;
one or more connectors each comprising a reflective coating on an interior thereof, ends of at least one of the groupings of threads that extend in only one of the first and second directions being guided thereinside a respective connector so as to be housed insides the connector and the one or more connectors housing portions of a respective light source therein, each of the groupings of threads extending in the first and second opposing directions being sewn together at a location distal the respective light source and each respective connector being substantially conical in shape and comprising a maximum diameter thereof adjacent the respective light source;

a data interpretation device operatively connected to the light sources so as to provide a transfer of a pre-assigned value of data from the data interpretation device to the light sources and the threads, the transfer of the pre-assigned value causing an illumination of the light sources that correlates to a specific representation of the data.

2. The information relay system of claim 1, wherein:
the data comprises words.

3. The information relay system of claim 2, wherein:
the specific representation of the data comprises a color and a pattern of illumination of the light sources onto the threads so as to provide a visual interpretation of the correlated data.

4. The information relay system of claim 1, wherein:
the data comprises relative information between one or more predetermined items.

5. The information relay system of claim 4, wherein:
the specific representation of the data comprises a color and a pattern of illumination of the light sources onto the threads so as to provide a visual interpretation of the correlated data.

6. The information relay system of claim 1, wherein:
the data is interactive information.

7. The information relay system of claim 6, wherein:
the specific representation of the data comprises a color and a pattern of illumination of the light sources onto the threads so as to provide a visual interpretation of the correlated data.

8. The information relay system of claim 7, wherein:
the interactive information comprises a color component.

9. The information relay system of claim 8, wherein:
the interactive information further comprises a digitally transmitted signal.

10. A woven fiber optic panel display system displaying information correlated to a specific data received by a data interpretation device, the system comprising:
one or more housings;
a plurality of transparent plates enclosed within a respective housing;
a plurality of fiber optic threads illuminated by plurality of respective light-emitting diodes and woven into one or more fiber optic mesh so as to comprise one or more respective woven fiber optic panel that is positioned between the transparent plates; and
an operative connection between each of the fiber optic threads, the plurality of respective light-emitting diodes and the data interpretation device for enabling correlation of the specific data received by the data interpretation device with pre-assigned lighting values so that one or more of the respective light-emitting diodes are illuminated according to these pre-assigned values so as to display the information correlated to the specific data throughout the one or more of the respective fiber optic panels.

11. The woven fiber optic panel display system of claim 10, wherein:
the illumination of the light-emitting diodes comprises one or more colors and patterns.

12. The woven fiber optic panel display system of claim 11, wherein:
data received by the data interpretation device comprises words, sounds and/or interactive information.

13. The woven fiber optic panel display system of claim 12, wherein:
the interactive information comprises a color component.

14. The woven fiber optic panel display system of claim 13, wherein:
the interactive information further comprises a digitally transmitted signal.

15. The woven fiber optic panel display system of claim 14, wherein:
the data interpretation device comprises an information processing unit.

16. The woven fiber optic panel display system of claim 15, wherein:
data received by the data interpretation device is transmitted by a device comprising an information processing unit.

17. The woven fiber optic panel display system of claim 15, wherein:
the display system is adapted for mounting with a wall surface.

18. The woven fiber optic panel display system of claim 10, wherein:
the display system is adapted for mounting with a wall surface.

* * * * *